US011272364B2

(12) United States Patent
Chu et al.

(10) Patent No.: US 11,272,364 B2
(45) Date of Patent: Mar. 8, 2022

(54) SECURITY IN A MULTI-BAND WIRELESS COMMUNICATION SYSTEM

(71) Applicant: NXP USA, Inc., Austin, TX (US)

(72) Inventors: Liwen Chu, Austin, TX (US); Manish Kumar, Austin, TX (US); Hongyuan Zhang, Austin, TX (US); Huiling Lou, Austin, TX (US)

(73) Assignee: NXP USA, Inc., Austin, TX (US)

( * ) Notice: Subject to any disclaimer, the term of this patent is extended or adjusted under 35 U.S.C. 154(b) by 1 day.

(21) Appl. No.: 16/903,810

(22) Filed: Jun. 17, 2020

(65) Prior Publication Data
US 2020/0404496 A1 Dec. 24, 2020

Related U.S. Application Data

(60) Provisional application No. 62/897,165, filed on Sep. 6, 2019, provisional application No. 62/863,690, filed on Jun. 19, 2019.

(51) Int. Cl.
*H04W 12/06* (2021.01)
*H04W 88/08* (2009.01)
*H04W 8/26* (2009.01)
*H04W 52/02* (2009.01)
*H04W 28/06* (2009.01)
*H04W 84/12* (2009.01)
*H04W 12/041* (2021.01)

(52) U.S. Cl.
CPC ............ *H04W 12/06* (2013.01); *H04W 8/26* (2013.01); *H04W 12/041* (2021.01); *H04W 28/06* (2013.01); *H04W 52/0216* (2013.01); *H04W 84/12* (2013.01); *H04W 88/08* (2013.01)

(58) Field of Classification Search
CPC ... H04W 12/06; H04W 12/041; H04W 88/08; H04W 8/26; H04W 52/0216; H04W 28/06; H04W 84/12; Y02D 30/70
See application file for complete search history.

(56) References Cited

U.S. PATENT DOCUMENTS

| 8,850,204 B2* | 9/2014 | Stacey | H04W 12/04 713/170 |
| 2010/0332822 A1* | 12/2010 | Liu | H04L 63/08 713/151 |
| 2015/0271137 A1* | 9/2015 | Seok | H04L 67/2842 370/338 |
| 2020/0267541 A1* | 8/2020 | Huang | H04W 12/10 |

OTHER PUBLICATIONS

Edward Au, "Specification Framework for TGbe," IEEE P802.11, 19/1262r8, Feb. 11, 2020; 20 pages.

* cited by examiner

Primary Examiner — Brandon J Miller

(57) ABSTRACT

A method for securing a multi-band wireless communication system includes authenticating a first station (STA) multi-link device (MLD) with a second STA MLD comprising negotiating a group of keys in a key negotiation (KN) band, the group of keys comprising a Pair-Wise Transient Key and a Group Transient Key. The KN band is one of a plurality of frequency bands. The first STA MLD includes a plurality of first STA links. The second STA MLD includes a plurality of second STA links. Each of first STA links and each corresponding second STA link are configured to transceive over a respective one of the plurality of frequency bands. Authenticating the first STA MLD in the KN band authenticates the first STA MLD for each of the frequency bands.

16 Claims, 6 Drawing Sheets

US 11,272,364 B2

SECURITY IN A MULTI-BAND WIRELESS COMMUNICATION SYSTEM

CROSS-REFERENCE TO RELATED APPLICATIONS

This application is a utility application claiming priority to U.S. Provisional Application Ser. No. 62/863,690 filed on Jun. 19, 2019, entitled "MULTI-BAND OPERATION: SECURITY," and U.S. Provisional Application Ser. No. 62/897,165 filed on Sep. 6, 2019, entitled "MULTI-BAND OPERATION: SECURITY," the entireties of which are incorporated by reference herein.

FIELD

This disclosure relates generally to wireless communication systems, and more specifically to securing a wireless communication system having multiple frequency bands operating with an Institute for Electrical and Electronics Engineers (IEEE) 802.11 wireless protocol.

BACKGROUND

Wireless standards such as the IEEE 802.11 standard, defines protocols for wireless communications between various devices. With an increasing demand for higher data bandwidth in systems such as in a Wireless Local Area Network (WLAN), the use of Extremely High Throughput (EHT) protocol and multi-band devices has driven a need to more tightly integrate and optimize these technologies.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for securing operating channels in a multi-band wireless communication system. IEEE 802.11 standards define certain communication protocols between an Access Point (AP) and a wireless Station (STA), however the security aspects of AP and STAs operating with EHT protocol and multiple frequency bands (e.g. "bands") has not been fully standardized. Embodiments herein disclose methods and apparatus for securing multi-link AP and STA devices, as well maintaining security during band-switching and other wireless operations.

Figure 1:
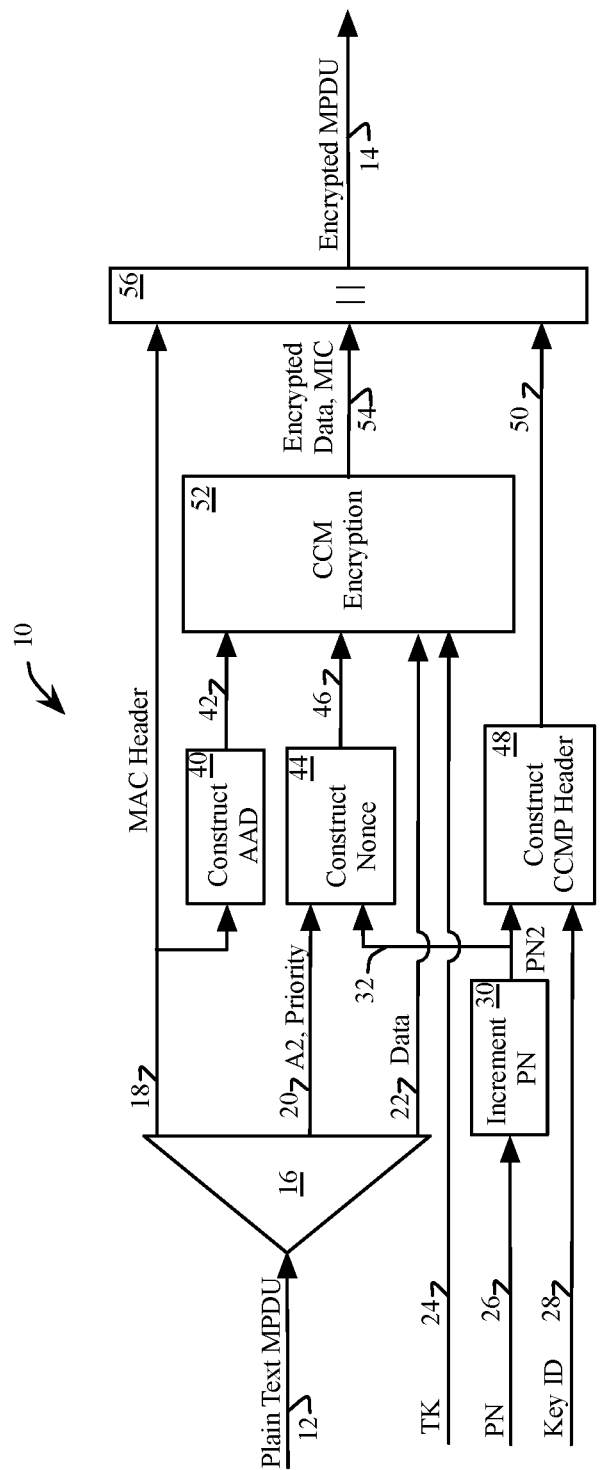
FIG. 1 is a schematic view of a Counter Mode with Cipher Block Chaining Medium Access Code (CCMP) encapsulation system, in accordance with an example embodiment of the present disclosure.

FIG. 1 shows a schematic view of an embodiment 10 of a CCMP encapsulation system. The embodiment 10 receives a data frame in the form of a plain text Medium Access Control (MAC) Protocol Data Unit (MPDU) 12 and constructs an encrypted MPDU 14 by encapsulating a MAC header, a CCMP header, a Protocol Data Unit (PDU) or "Data", a Message Integrity Code (MIC) variable and a Frame Check Sequence (FCS). The data frame of the Plain Text MPDU 12 is parsed with a parser circuit 16 to extract the MAC header 18, at least one octet 20 of the MAC header 18, and a data field 22 having at least one octet. In one embodiment, the at least one octet 20 is a second address octet (A2) from a 48 bit address field. In another embodiment, the at least one octet 20 includes a first address octet (A1), the second address octet (A2), a third address octet (A3) and a fourth address octet (A4). The embodiment 10 further includes a temporary key (TK) 24, a Packet Number (PN) 26 and a Key ID 28. In one embodiment, the TK is derived from a Pair-Wise Transient Key (PTK), which in turn is derived from a Pair-Wise Master Key (PMK). In one embodiment, the PN 26 is an eight octet field of the CCMP header, which further includes the Key ID 28.

For each data frame the PN 26 is incremented by an increment circuit 30 to form an incremented PN2 32. A construct Additional Authentication Data (AAD) circuit 40 constructs an AAD 42 from the MAC header 18. A construct Nonce circuit 44 constructs a Nonce 46 from the at least one octet 20, (A2 in one example), and from the PN2 32. A Nonce in the context of this disclosure is an arbitrary number that is used only once for cryptographic communication. A construct CCMP header circuit 48 constructs a CCMP header 50 from the incremented PN2 32 and the Key ID 28. A CCM encryption circuit 52 generates an encrypted data field and the MIC variable as a combined field 54. The MAC header 18, the combined field 54 and the CCMP header 50 are concatenated with a concatenation circuit 56 to form the encrypted MPDU 14.

Figure 2:
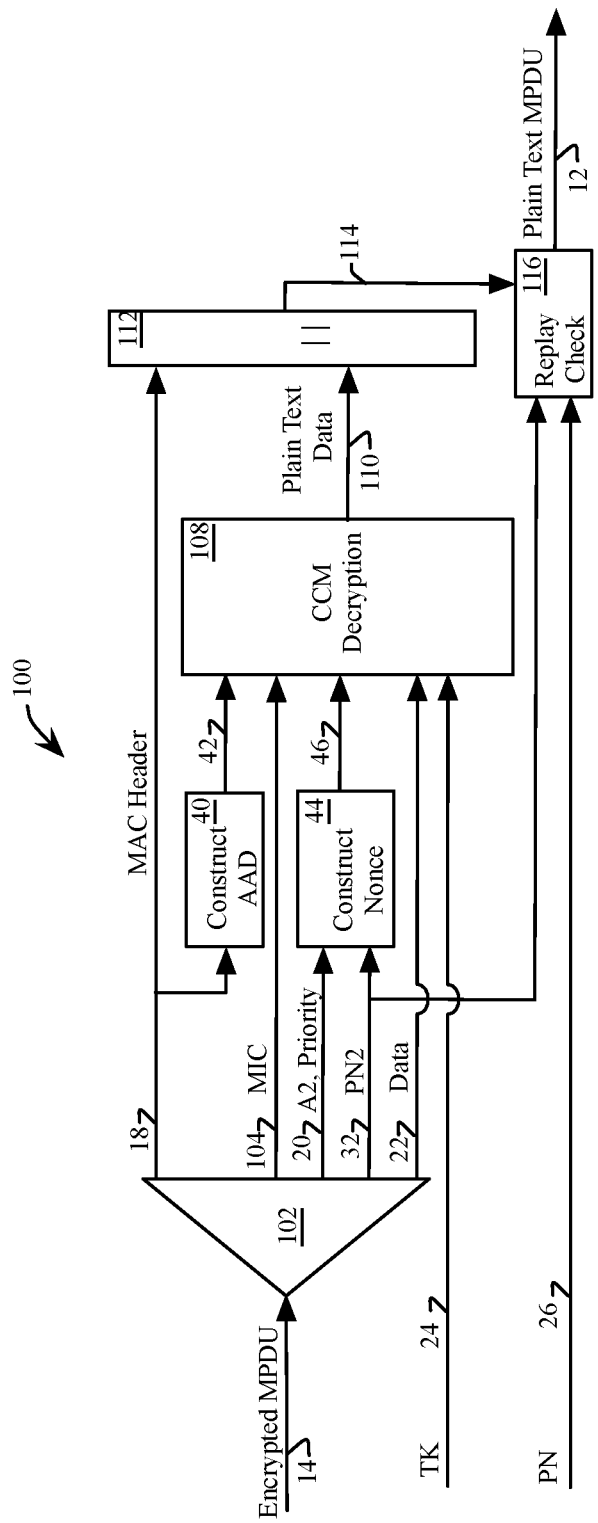
FIG. 2 is a schematic view of a CCMP decapsulation system, in accordance with an example embodiment of the present disclosure.

FIG. 2, with ongoing reference to FIG. 1, shows a schematic view of an embodiment 100 of a CCMP decapsulation system. The embodiment 100 receives the encrypted MPDU 14 and constructs the plain text MPDU 12. The encrypted MPDU 14 is parsed with a parser circuit 102 to extract the MAC header 18, the MIC 104, at least one octet 20 of the MAC header 18, the incremented PN2 32 and the data field 22 having at least one octet. The embodiment 100 further includes the TK 24, and the PN 26. The construct AAD circuit 40 constructs the AAD 42 from the MAC header 18. The construct Nonce circuit 44 constructs the Nonce 46 from the at least one octet 20, (A2 in one example), and from the PN2 32. A CCM decryption circuit 108 generates a plain text data field 110. The MAC header 18 and the plain text data field are concatenated with a concatenation circuit 112 to form a conditional plain text MPDU 114. A replay check circuit 116 compares the PN 26 with the incremented PN2 32 and generates the plain text MPDU 12 if the plain text MPDU 12 has not been previously generated.

Figure 3:
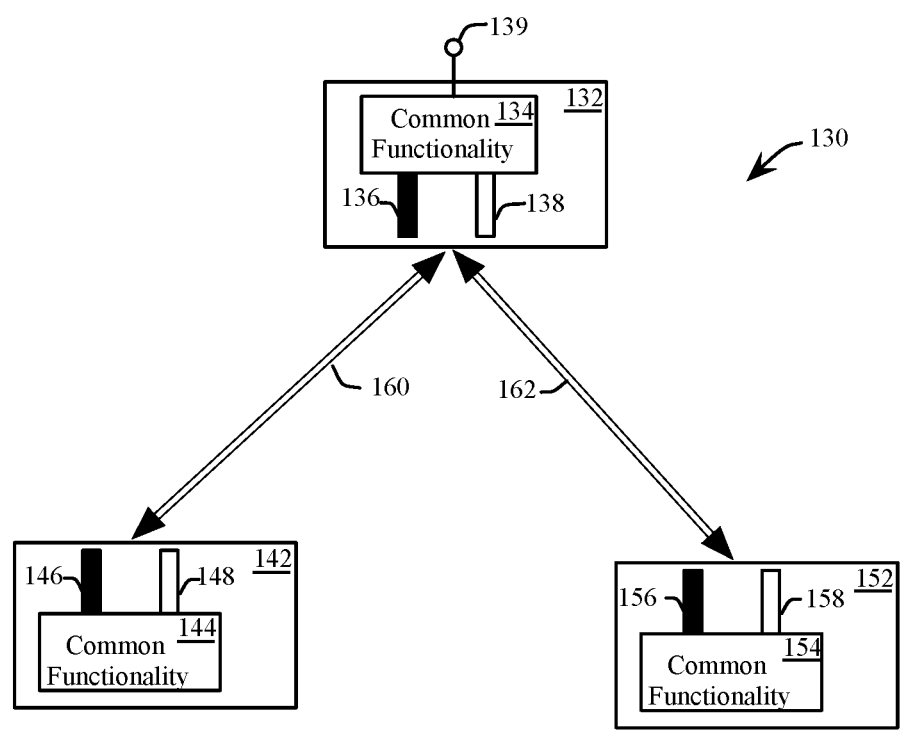
FIG. 3 is a schematic view of a multi-band wireless communication system, in accordance with an example embodiment of the present disclosure.

FIG. 3 shows a schematic view of an embodiment 130 of a multi-band wireless communication system including two STA MLDs in communication with an AP MLD. In another embodiment, more than two STA MLDs exchange frames and communicate with the same AP MLD. The embodiment 130 shows two STA MLDs for clarity of exposition but should not be construed as limiting the number of STA MLDs shared by a common AP MLD. An AP Multi-Link Device (MLD) 132 includes a common MAC up layer functionality 134 providing common 802.11 functions for an associated first AP 136 and a second AP 138. In one embodiment the AP MLD 132 has a Service Access Point (SAP) providing a network endpoint 139 of an Open Systems Interconnection (OSI) network. The embodiment 130 further includes a first STA MLD 142. The STA MLD 142 includes a common MAC up layer functionality 144 providing common 802.11 functions for an associated first STA 146 and a second STA 148. The embodiment 130, further includes a second STA MLD 152. The STA MLD 152 includes a common MAC up layer functionality 154 providing common 802.11 functions for an associated first STA 156 and a second STA 158. Each of the APs 136 and 138 of the AP MLD 132 communicate with the respective STAs 146 and 148 of the first STA MLD 142 over communication channels 160. Each of the APs 136 and 138 of the AP MLD 132 communicate with the respective STAs 156 and 158 of the second STA MLD 152 over communication channels 162.

The communication channels 160 and 162 are used by the AP MLD 132 to authenticate with the STA MLDs 142 and 152 using a group of keys negotiated over a key negotiation (KN). Although the AP MLD 132 authenticates and associates with each STA MLD 142 and 152 using a single link (e.g., a single link with a single selected frequency band), during subsequent frame exchange all available links of the AP MLD are used to communicate with a respective STA MLD to improve communication bandwidth.

In one embodiment, the KN band is used between a first AP 136 of the AP MLD 132 and the first STA 146 of the first STA MLD 142. In one example, the KN link is formed by one of a plurality of 20 MHz sub-channels, or one of several adjacent 20 MHz sub-channels (e.g., forming an 80 Mhz or 160 Mhz composite channel). Authenticating the first STA MLD 142 (or second STA MLD 152) over one KN link, authenticates the respective STA MLD 142 for each of the frequency links supported by the respective communication channel 160. Accordingly, the wireless communication system reduces authentication overhead and also saves power.

In one embodiment, the group of keys includes a PTK used to encrypt and decrypt the plurality of unicast frames wherein the same PTK and PN is used for all of the frequency links. In another embodiment, the group of keys includes a plurality of Group Transient Keys (GTKs), wherein a different GTK and PN is used for a respective one of the AP MLD links (e.g. the first AP 136 and the second AP 138). It should be appreciated that, throughout this disclosure, that embodiments using a GTK are also realized as embodiments using an Integrity Group Temporal Key (IGTK) or a Beacon IGTK (BIGTK), rather than a GTK. For the encryption and decryption of individually addressed frames using PTK, the Receiver Address (RA) and the Transmitter Address (TA) are the address of the respective links for the STA MLD and AP MLD. For the encryption and decryption of group addressed frames using GTK, the RA is the address of the multicast or broadcast address, and the TA is the address of the respective link of the AP MLD.

Figure 4:
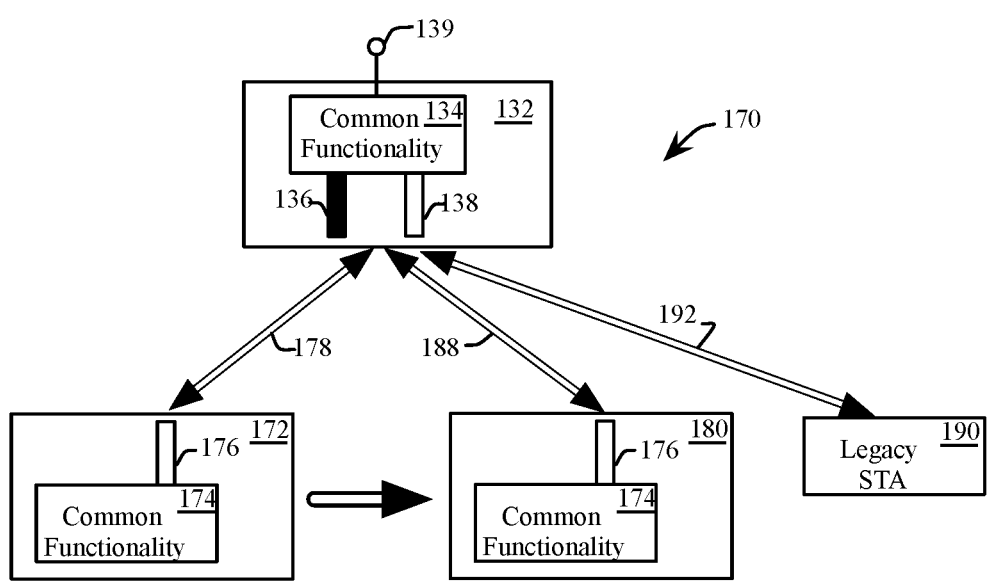
FIG. 4 is a schematic view of a multi-band wireless communication system, in accordance with an example embodiment of the present disclosure.

FIG. 4 shows a schematic view of an embodiment 170 of a multi-band wireless communication system including a combination of a STA MLDs and a legacy STA 190 in communication with the AP MLD 132. In one example the legacy STA 190 conforms only to the 802.11a standard. In another example, the STA MLD 172 (or 180) comprises the EHT protocol and the legacy STA 190 does not comprise the EHT protocol. The embodiment 170 includes a first STA MLD 172 having a common MAC up layer functionality 174 providing common 802.11 functions for an associated first STA 176.

During an authentication between AP MLD 132 and the STA MLD 172, a group of keys are negotiated that authenticate both of the APs 136 and 138 to the STA MLD 172. Thus, when the STA MLD 172 changes its working link from AP 136 to AP 138, (where the STA MLD is shown as element 180 to denote the new working link), the prenegotiated key from the group of keys is used by the STA MLD 180 without requiring a reauthentication between the STA MLD 180 and the AP MLD 132. A legacy STA 190 authenticates with the AP MLD 132 over a communication channel 192.

Figure 5:
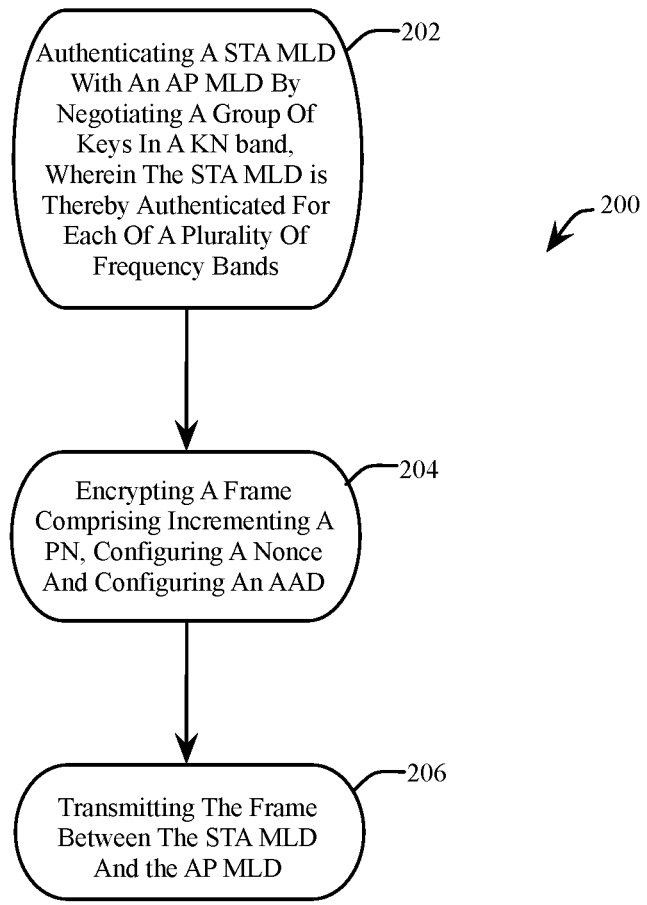
FIG. 5 is a flowchart representation of a method for securing a multi-band wireless communication system in accordance with an example embodiment of the present disclosure.

FIG. 5, with reference to FIG. 1, FIG. 2 and FIG. 3, shows an example embodiment 200 of a method for securing a multi-band wireless communication system 130. At 202, a STA MLD 142 is authenticated with an AP MLD 132 by negotiating a group of keys in a KN band, wherein the STA MLD is thereby authenticated for each of a plurality of frequency bands. At 204, a frame is encrypted by incrementing a PN 26, configuring a Nonce 46 and configuring an AAD 42. At 206, the frame is transmitted between the ST MLD 142 and the AP MLD 132.

Figure 6:
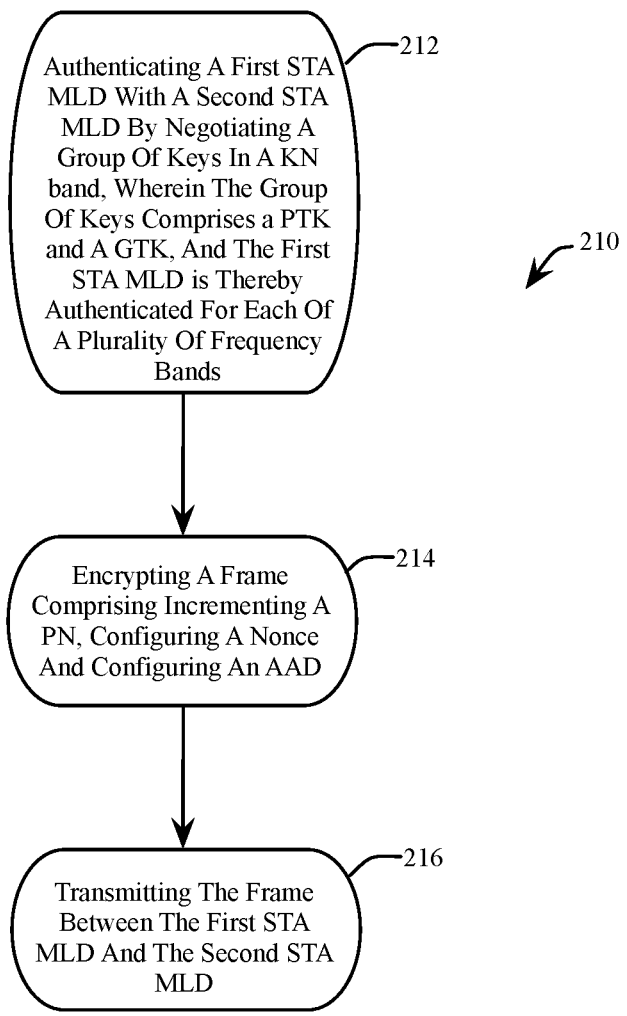
FIG. 6 is a flowchart representation of a method for securing a multi-band wireless communication system in accordance with an example embodiment of the present disclosure.

FIG. 6, with reference to FIG. 1, FIG. 2 and FIG. 3, shows an example embodiment 210 of a method for securing a multi-band wireless communication system. At 212, a first STA MLD is authenticated with a second STA MLD by negotiating a group of keys in a KN band, wherein the group of keys comprises a PTK and a GTK, and the first STA MLD is thereby authenticated for each of a plurality of frequency bands. At 214, a frame is encrypted by incrementing a PN 26, configuring a Nonce 46 and configuring an AAD 42. At 216, the frame is transmitted between the first ST MLD and the second STA MLD.

As will be appreciated, embodiments as disclosed include at least the following. In one embodiment, a method for securing a multi-band wireless communication system comprises authenticating a station (STA) multi-link device (MLD) with an Access Point (AP) MLD comprising negotiating a group of keys in a key negotiation (KN) link, the KN link being one of a plurality of frequency bands, wherein the STA MLD comprises a plurality of STA links, the AP MLD comprises a plurality of AP links, each STA link and each corresponding AP link configured to transceive over a respective one of the plurality of frequency bands, and wherein authenticating the STA MLD in the KN band authenticates the STA MLD for each of the frequency bands. Encrypting a frame comprises incrementing a Packet Number (PN) corresponding to the frame; configuring a Nonce with the PN and at least one address octet of a Medium Access Control (MAC) header; configuring an Additional Authentication Data (AAD) with the at least one address octet of the MAC header; and transmitting the frame between the STA MLD and the AP MLD, in a first one of the frequency bands.

Alternative embodiments of the method for securing a multi-band wireless communication system include one of the following features, or any combination thereof. One key in the group of keys is a Pair-Wise Transient Key (PTK) derived from a Pair-Wise Master Key (PMK), the frame is one of plurality of unicast frames, the PTK is used for encrypting and decrypting one or more of the unicast frames for all of the frequency bands used by both the STA MLD and the AP MLD, and wherein the PN is used for all of the frequency bands. The at least one address octet of the MAC header comprises a second address octet (A2) of the frame received by the STA MLD, and the A2 address octet is used to configure the Nonce. The at least one address bit of the MAC header comprises a first address octet (A1), a second address octet (A2), a third address octet (A3) and a fourth address octet (A4) of the frame received by the STA MLD, and the A1, A2, A3 and A4 address octets are used to configure the AAD. The frame is modified to form a second frame and the second frame is transmitted with a modified transmitter address of the STA MLD and the second frame is received with a modified receiver address of the AP MLD. Each of a plurality of keys in the group of keys are a Group Transient Key (GTK) generated by the AP MLD, a different one of the plurality of GTKs is used for a respective one of the plurality of AP links of the AP MLD, the PN is one of a plurality of PNs and wherein a different one of the plurality of PNs is used for a respective one of the plurality of AP links. The at least one address octet of the MAC header comprises an address of the frame transmitted by the AP MLD over an AP link associated with a corresponding STA link of a STA MLD. The at least one address octet of the MAC header comprises a second address octet (A2) of a second frame transmitted by the STA MLD, and the A2 address octet is used to configure the Nonce, wherein the frame is transmitted by the AP MLD over a first AP link associated with a corresponding first STA link of a STA MLD and the second frame is transmitted by the STA MLD over a second STA link associated with a corresponding second AP link of a AP MLD. The at least one address octet of the MAC header comprises a first address octet (A1), a second address octet (A2), a third address octet (A3) and a fourth address octet (A4) of the frame received by the STA MLD, and the A1, A2, A3 and A4 address octets are used to configure the AAD, wherein the frame is transmitted by the AP MLD over a first AP link associated with a corresponding first STA link of a STA MLD and the second frame is transmitted by the STA MLD over a second STA link associated with a corresponding second AP link of a AP MLD. The frame is modified to form a second frame and the second frame is transmitted with a modified transmitter address of the STA MLD.

In another embodiment, an apparatus comprises a station (STA) multi-link device (MLD), comprising a plurality of STA links; and an Access Point (AP) MLD, comprising a plurality of AP links, each STA link and each corresponding AP link configured to transceive over a respective one of a plurality of frequency bands, wherein the AP MLD is configured to: authenticate each of the frequency bands of the STA MLD by negotiating a group of keys in a key negotiation (KN) band, the KN band being one of the plurality of frequency bands; encrypt a frame comprising incrementing a Packet Number (PN) corresponding to the frame, configure a Nonce with the PN and at least one address octet of a Medium Access Control (MAC) header, and configure an Additional Authentication Data (AAD) with the at least one address octet of the MAC header; and transmit the frame between the STA MLD and the AP MLD, in a first one of the frequency bands.

Alternative embodiments of the apparatus include one of the following features, or any combination thereof. One key in the group of keys is a Pair-Wise Transient Key (PTK) derived from a Pair-Wise Master Key (PMK), the frame is one of plurality of unicast frames, the PTK is used for encrypting and decrypting one or more of the unicast frames for all of the frequency bands used by both the STA MLD and the AP MLD, and wherein the PN is used for all of the frequency bands. The at least one address octet of the MAC header comprises a second address octet (A2) of the frame received by the STA MLD, and the A2 address octet is used to configure the Nonce. The at least one address octet of the MAC header comprises a first address octet (A1), a second address octet (A2), a third address octet (A3) and a fourth address octet (A4) of the frame received by the STA MLD, and the A1, A2, A3 and A4 address octets are used to configure the AAD. Each of a plurality of keys in the group of keys are a Group Transient Key (GTK) generated by the AP MLD, a different one of the plurality of GTKs is used for a respective one of the plurality of AP links of the AP MLD, the PN is one of a plurality of PNs and wherein a different one of the plurality of PNs is used for a respective one of the plurality of AP links. The at least one address octet of the MAC header comprises a second address octet (A2) of a second frame transmitted by the STA MLD, and the A2 address octet is used to configure the Nonce, wherein the frame is transmitted by the AP MLD over a first AP link associated with a corresponding first STA link of a STA MLD and the second frame is transmitted by the STA MLD over a second STA link associated with a corresponding second AP link of a AP MLD. The at least one address octet of the MAC header comprises a first address octet (A1), a second address octet (A2), a third address octet (A3) and a fourth address octet (A4) of the frame received by the STA MLD, and the A1, A2, A3 and A4 address octets are used to configure the AAD, wherein the frame is transmitted by the AP MLD over a first AP link associated with a corresponding first STA link of a STA MLD and the second frame is transmitted by the STA MLD over a second STA link associated with a corresponding second AP link of a AP MLD.

In another embodiment, a method for securing a multi-band wireless communication system comprises authenticating a first station (STA) multi-link device (MLD) with a second STA MLD comprising negotiating a group of keys in a key negotiation (KN) band, the group of keys comprising a Pair-Wise Transient Key and a Group Transient Key, the KN band being one of a plurality of frequency bands, wherein the first STA MLD comprises a plurality of first STA links, the second STA MLD comprises a plurality of second STA links, each first STA link and each corresponding second STA link configured to transceive over a respective one of the plurality of frequency bands, and wherein authenticating the first STA MLD in the KN band authenticates the first STA MLD for each of the frequency bands.

Alternative embodiments of the method for securing a multi-band wireless communication system include one of the following features, or any combination thereof. Encrypting a frame comprises, incrementing a Packet Number (PN) corresponding to the frame, configuring a Nonce with the PN and at least one address octet of a Medium Access Control (MAC) header, and configuring an Additional Authentication Data (AAD) with the at least one address octet of the MAC header. The frame is transmitted between the first STA MLD and the second STA MLD, in a first one of the frequency bands.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for securing a multi-band wireless communication system comprising:
   authenticating a station (STA) multi-link device (MLD) with an Access Point (AP) MLD including communication channels that are used by the AP MLD to authenticate with the STA MLD using a group of keys negotiated in a key negotiation (KN) band, the KN band being one of a plurality of frequency bands, wherein the STA MLD comprises a plurality of STA links, the AP MLD comprises a plurality of AP links, each STA link and each corresponding AP link configured to communicate over a respective one of the plurality of AP links, and wherein authenticating the STA MLD in the KN band authenticates the STA MLD for each of the frequency bands;
   encrypting a frame comprising,
      incrementing a Packet Number (PN) corresponding to the frame,
      configuring a Nonce with the PN and at least one address octet of a Medium Access Control (MAC) header,
      configuring an Additional Authentication Data (AAD) with the at least one address octet of the MAC header, wherein the at least one address octet of the MAC header comprises a second address octet (A2) of a second frame transmitted by the STA MLD, and the A2 address octet is used to configure the Nonce, wherein the frame is transmitted by the AP MLD over a first AP link associated with a corresponding first STA link of the STA MLD and the second frame is transmitted by the STA MLD over a second STA link associated with a corresponding second AP link of a AP MLD; and
   transmitting the frame between the STA MLD and the AP MLD, in a first one of the frequency bands, wherein each of a plurality of keys in the group of keys are a Group Transient Key (GTK) generated by the AP MLD, a different GTK of the plurality of GTKs is used for a respective AP link of the plurality of AP links of the AP MLD, the PN is one of a plurality of PNs and wherein a different one of the plurality of PNs is used for a respective one of the plurality of AP links.

2. The method of claim 1 wherein one key in the group of keys is a Pair-Wise Transient Key (PTK) derived from a Pair-Wise Master Key (PMK), the frame is one of plurality of unicast frames, the PTK is used for encrypting and decrypting one or more of the unicast frames for all of the frequency bands used by both the STA MLD and the AP MLD, and wherein the PN is used for all of the frequency bands.

3. The method of claim 2 wherein the at least one address octet of the MAC header comprises a second address octet (A2) of the frame received by the STA MLD, and the A2 address octet is used to configure the Nonce.

4. The method of claim 2 wherein the at least one bit of the MAC header comprises a first address octet (A1), a second address octet (A2), a third address octet (A3) and a fourth address octet (A4) of the frame received by the STA MLD, and the A1, A2, A3 and A4 address octets are used to configure the AAD.

5. The method of claim 2 further comprising modifying the frame to form a second frame and transmitting the second frame with a modified transmitter address of the STA MLD and receiving the second frame with a modified receiver address of the AP MLD.

6. The method of claim 1 wherein the at least one address octet of the MAC header comprises an address of the frame transmitted by the AP MLD over an AP link associated with a corresponding STA link of a STA MLD.

7. The method of claim 1 wherein the at least one address octet of the MAC header comprises a first address octet (A1), a second address octet (A2), a third address octet (A3) and a fourth address octet (A4) of the frame received by the STA MLD, and the A1, A2, A3 and A4 address octets are used to configure the AAD, wherein the frame is transmitted by the AP MLD over a first AP link associated with a corresponding first STA link of a STA MLD and the second frame is transmitted by the STA MLD over a second STA link associated with a corresponding second AP link of a AP MLD.

8. The method of claim 1 further comprising modifying the frame to form a second frame and transmitting the second frame with a modified transmitter address of the STA MLD.

9. An apparatus comprising:
   a station (STA) multi-link device (MLD), comprising a plurality of STA links; and
   an Access Point (AP) MLD, comprising a plurality of AP links and communication channels to communicate with respective STA MLDs, each STA link and each corresponding AP link configured to communicate over a respective one of a plurality of frequency bands, wherein the AP MLD is configured to:
   authenticate a STA MLD using the communication channels by negotiating a group of keys in a key negotiation (KN) band, the KN band being one frequency band of the plurality of frequency bands,
   encrypt a frame comprising incrementing a Packet Number (PN) corresponding to the frame, configure a Nonce with the PN and at least one address octet of a Medium Access Control (MAC) header, and configure an Additional Authentication Data (AAD) with the at least one address octet of the MAC header, and
   transmit the frame between the STA MLD and the AP MLD, in a first one of the frequency bands, wherein each of a plurality of keys in the group of keys are a Group Transient Key (GTK) generated by the AP MLD, a different one of the plurality of GTKs is used for a respective one of the plurality of AP links of the AP MLD, the PN is one of a plurality of PNs and wherein a different one of the plurality of PNs is used for a respective one of the plurality of AP links, and wherein the at least one address octet of the MAC header comprises a second address octet (A2) of a second frame transmitted by the STA MLD, and the A2 address octet is used to configure the Nonce, wherein the frame is transmitted by the AP MLD over a first AP link associated with a corresponding first STA link of a STA MLD and the second frame is transmitted by the STA MLD over a second STA link associated with a corresponding second AP link of a AP MLD.

10. The apparatus of claim 9 wherein one key in the group of keys is a Pair-Wise Transient Key (PTK) derived from a Pair-Wise Master Key (PMK), the frame is one of plurality of unicast frames, the PTK is used for encrypting and decrypting one or more of the unicast frames for all of the frequency bands used by both the STA MLD and the AP MLD, and wherein the PN is used for all of the frequency bands.

11. The apparatus of claim 10 wherein the at least one address octet of the MAC header comprises a second address octet (A2) of the frame received by the STA MLD, and the A2 address octet is used to configure the Nonce.

12. The apparatus of claim 10 wherein the at least one address octet of the MAC header comprises a first address octet (A1), a second address octet (A2), a third address octet (A3) and a fourth address octet (A4) of the frame received by the STA MLD, and the A1, A2, A3 and A4 address octets are used to configure the AAD.

13. The apparatus of claim 9 wherein the at least one address octet of the MAC header comprises a first address octet (A1), a second address octet (A2), a third address octet (A3) and a fourth address octet (A4) of the frame received by the STA MLD, and the A1, A2, A3 and A4 address octets are used to configure the AAD, wherein the frame is transmitted by the AP MLD over a first AP link associated with a corresponding first STA link of a STA MLD and the second frame is transmitted by the STA MLD over a second STA link associated with a corresponding second AP link of a AP MLD.

14. A method for securing a multi-band wireless communication system comprising:
authenticating a first station (STA) multi-link device (MLD) or a second STA MLD with an access point (AP) MLD by negotiating using a group of keys in a key negotiation (KN) band, the group of keys comprising a Pair-Wise Transient Key and a Group Transient Key, the KN band being one of a plurality of frequency bands, wherein the first STA MLD comprises a plurality of first STA links, the second STA MLD comprises a plurality of second STA links, each first STA link and each corresponding second STA link configured to communicate with the AP MLD over a respective one of the plurality of frequency bands, and wherein authenticating the first STA MLD or the second STA MLD in the KN band authenticates the first STA MLD or the second STA MLD for each of the frequency bands;
encrypting a frame comprising incrementing a Packet Number (PN) corresponding to the frame;
configuring a Nonce with the PN and at least one address octet of a Medium Access Control (MAC) header, and configure an Additional Authentication Data (AAD) with the at least one address octet of the MAC header, and
transmitting the frame between the STA MLD and the AP MLD, in a first one of the frequency bands, wherein each of a plurality of keys in the group of keys are a Group Transient Key (GTK) generated by the AP MLD, a different one of the plurality of GTKs is used for a respective one of the plurality of AP links of the AP MLD, the PN is one of a plurality of PNs and wherein a different one of the plurality of PNs is used for a respective one of the plurality of AP links, and wherein the at least one address octet of the MAC header comprises a second address octet (A2) of a second frame transmitted by the STA MLD, and the A2 address octet is used to configure the Nonce, wherein the frame is transmitted by the AP MLD over a first AP link associated with a corresponding first STA link of a STA MLD and the second frame is transmitted by the STA MLD over a second STA link associated with a corresponding second AP link of a AP MLD.

15. The method of claim 14 further comprising encrypting a frame comprising, incrementing a Packet Number (PN) corresponding to the frame, configuring a Nonce with the PN and at least one address octet of a Medium Access Control (MAC) header, and configuring an Additional Authentication Data (AAD) with the at least one address octet of the MAC header.

16. The method of claim 15 further comprising transmitting the frame between the first STA MLD and the second STA MLD, in a first one of the frequency bands.

* * * * *